Nov. 29, 1955 W. L. HURFORD 2,725,475
BALANCED PUSH-PULL WAVE GENERATION CIRCUITS
Filed Dec. 6, 1950
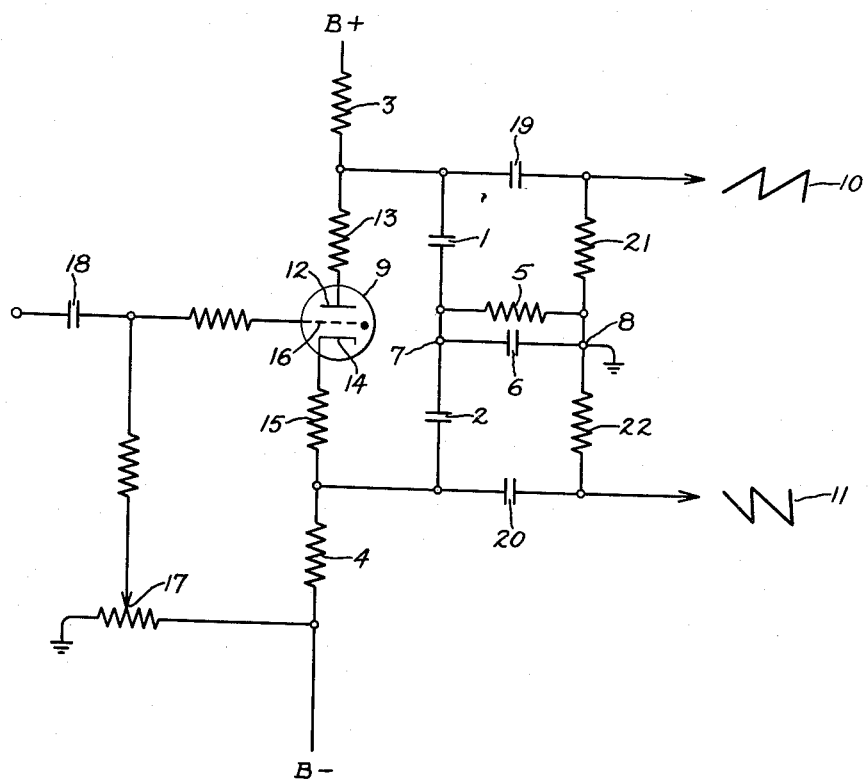
Inventor:
Winslow L. Hurford,
by Merton D. Morse
His Attorney.

United States Patent Office 2,725,475
Patented Nov. 29, 1955

2,725,475

BALANCED PUSH-PULL WAVE GENERATION CIRCUITS

Winslow L. Hurford, North Syracuse, N. Y., assignor to General Electric Company, a corporation of New York Application December 6, 1950, Serial No. 199,541

5 Claims. (Cl. 250—36)

The present invention relates to apparatus for the generation of balanced push-pull waves and, in particular, to improved circuit arrangements for producing balanced push-pull sawtooth waves for cathode ray tube deflection purposes.

In certain applications of cathode ray tubes, for instance, in various television applications, it is necessary to provide a pair of balanced deflection voltages or currents to the tube to avoid production of unacceptable distortion on the screen of the cathode ray tube.

In one such circuit arrangement, each of first and second capacitors of equal capacitances has one end connected to a fixed potential point about which it is desired to develop the aforementioned balanced voltages. One of the capacitors is charged through a resistance from the positive terminal of a source of potential. The other capacitor is charged through another resistance from the negative terminal of a source of potential. The capacitors are periodically discharged by means of an electron discharge device which, for example, may be a gaseous discharge device connected in shunt across the capacitors. The aforementioned gaseous discharge device can be rendered conductive periodically by signals from an external source or it can be rendered conductive when the potential across both capacitors exceed a particular value. Accordingly, it is apparent that if the supply voltages for the capacitors and the charging resistors are properly chosen the remote ends of the capacitors will move in opposite directions in potential but symmetrically with respect to the aforementioned potential point.

In the circuit arrangement under consideration, a balanced push-pull voltage wave is no longer developed if the charging rate of each of the capacitors differs. A difference in the charging rate of the capacitors may be caused by a change in the positive or negative supply voltage or by changes in the resistances of the charging resistors. The present invention is directed to the provision of improvements in circuits of the kind described above whereby any unbalances in the waves produced by supply voltage variations and differences in resistances of the charging resistors and the like are eliminated.

Accordingly, an object of the present invention is to provide improvements in balanced push-pull wave generation circuits.

Another object of the present invention is to provide a circuit for developing balanced push-pull sawtooth voltages which are substantially independent of variations in supply voltage, circuit component tolerances, and the like.

In accordance with an exemplary embodiment of the invention, a resistive member is provided between the common connection of the aforementioned capacitors and the aforementioned fixed potential point. The resistive member has an impedance substantially greater than the impedance of either of the aforementioned charging resistors. When the aforementioned capacitors are charging at the same rate so as to develop balanced voltages across the aforementioned capacitors, the net voltage developed across the resistive member is zero and hence the common connection to the capacitors is at the same potential as the fixed potential point.

If now, for example, the positive supply voltage should decrease, the corresponding capacitor would charge at a slower rate, and accordingly, a potential would be developed across the resistive member which would lower the potential at the common connection of the capacitors, and accordingly, tend to restore the charging rate of this capacitor to the rate at which the other capacitor is charging. Thus, a net current flow through the aforementioned resistive member develops a potential thereacross of a magnitude which compensates for the drop in the positive potential source so that both capacitors charge at the same rate. A similar action takes place if the negative supply voltage varies or if the components of the circuit should be off tolerance. In order to maintain the common connection of the capacitors of the same potential as the aforementioned fixed potential point with reference to alternating potentials, a by-pass capacitor is preferably connected across the aforementioned resistive member.

The features of my invention which I believe to be novel are set forth with particularity in the appended claims. My invention itself, however, together with further objects and advantages thereof, may best be understood by reference to the following descritpion taken in connection with the single figure of the drawing in which is shown a schematic diagram of a circuit embodying my invention.

In the drawing is shown a circuit for developing balanced push-pull voltages for use with cathode ray electron discharge devices for deflecting the beam thereof. The circuit includes first and second capacitors 1 and 2 having substantially equal capacitances connected in series. The remote end of the first capacitor 1 is connected through a resistance 3 to the positive terminal of a source of unidirectional potential. The remote end of the second capacitor 2 is connected through another resistance 4 to the negative terminal of a source of unidirectional potential. Accordingly, the first capacitor is charged through resistance 3 to a positive potential and the second capacitor is charged through resistance 4 to a negative potential. Preferably, resistance 3 and 4 are made inversely proportional to the power supply voltages, so that capacitors 1 and 2 are charged at substantially uniform rate.

In accordance with my invention a third resistor 5 shunted by a third capacitor 6 is connected between the common connection 7 of the first and second capacitors 1 and 2 and a fixed potential point 8 which may be ground, for instance. The magnitude of the resistance 5 is substantially greater than the magnitude of either of the first and second resistances 3 and 4, and the magnitude of said third capacitor 6 is substantially greater than either of said first and second capacitors 1 and 2. The resistance 5 and capacitor 6 are made large so as not to interfere with the normal charging rate of the first and second capacitors 1 and 2. The third capacitor 6 provides substantially short circuit for the sawtooth voltages developed across these capacitors between the fixed potential point 8 and the common connection 7 of the first and second capacitors 1 and 2.

The operation of the circuit described in the preceding paragraph will best be understood by taking a specific example. Suppose that the positive supply voltage were to drop appreciably. This would cause capacitor 1 to charge at a reduced rate. Hence, the charging current of capacitor 2 flowing through resistance 5 would exceed the charging current of the capacitor 1 flowing through this same resistance, and accordingly the potential of the point 7 would drop below ground to a point at which the charging currents for each of the capacitors through the resistance 5 is the same. In this way a change in positive supply voltage is compensated for so as to maintain the charging rate of each of the capacitors the same. A similar effect would take place if the negative supply voltage were to change or if the resistances of the charging resistors were to change.

The gaseous discharge device 9 functions to periodically discharge the capacitors 1 and 2 to produce the sawtooth voltage waves represented by graphs 10 and 11 between the remote ends of the capacitors 1 and 2 and ground. The plate 12 of the gaseous discharge device 9 is connected through a current limiting resistor 13 to the remote end of the first capacitor 1. The cathode 14 of the gaseous discharge device 9 is connected through a current limiting resistor 15 to the remote end of the second capacitor 2. The grid 16 of the gaseous discharge device 9 is connected to a potential point 17 which determines the magnitude of voltage that may be developed across said first and second capacitors 1 and 2 before they are discharged by the gaseous discharge device 9. External signals may be coupled to the grid 16 of the gaseous discharge device through the capacitor 18 for synchronizing the sawtooth voltages 10 and 11 with an external synchronizing or triggering signal.

The push-pull voltages 10 and 11 developed across the capacitors 1 and 2 are coupled to a utilization circuit which may include the plates of a cathode ray electron discharge device through capacitors 19 and 20. Resistances 21 and 22 connected between capacitors 19 and 20 and point 8, respectively, are load resistances. Time constants comprising resistance 21 and capacitance 19, and resistance 22 and capacitance 20 are made substantially longer than the time constants comprising either resistance 3 and capacitance 1, or resistance 4 and capacitance 2. The capacitor 6 is made sufficiently large so that for the push-pull voltages developed across the capacitors 1 and 2, point 7 is at substantially the same potential as point 8.

Thus it is apparent that I provide simple and effective circuits for producing balanced push-pull sawtooth voltages which are substantially independent of variations in supply voltage and changes in the values of the components of the circuit, and the like.

While I have shown a particular embodiment of my invention, it will, of course, be understood that I do not wish to be limited thereto since various modifications will readily occur to those skilled in the art. I, therefore, contemplate by the appended claims to cover any such modifications as fall within the true spirit and scope of my invention.

What I claim as new and desire to secure by Letters Patent of the United States is:

1. A circuit for developing balanced push-pull sawtooth voltages comprising a first resistor and a first capacitor serially connected, a second resistor and a second capacitor serially connected, a third resistor and a third capacitor, the terminals of said first and second resistors remote from said capacitors having a unidirectional potential impressed therebetween, the electrodes of said capacitors remote from said first and second resistors being connected to a fixed potential point intermediate in potential to the potentials of said remote terminals of said resistors through said third resistor and said third capacitor connected in shunt, said third resistor having a resistance substantially greater than either of said first and second resistors, said third capacitor having a capacitance substantially greater than either of said other capacitors, said first and second capacitors having substantially equal magnitudes, means in shunt to said first and second capacitors for periodically discharging said first and second capacitors.

2. A circuit for developing balanced push-pull sawtooth voltages comprising a first resistor and a first capacitor serially connected, a second resistor and a second capacitor serially connected, a third resistor and a third capacitor, means for impressing a unidirectional operating potential between the terminals of said first and second resistors remote from said capacitors, the electrodes of said capacitors remote from said first and second resistors being connected to a fixed potential point intermediate in potential to the potentials of said remote terminals of said resistors through said third resistor and said third capacitor connected in shunt, said third resistor having a resistance substantially greater than either of said first and second resistors, said third capacitor having a capacitance substantially greater than either of said other capacitors, said first and second capacitors having substantially equal magnitudes, means in shunt to said first and second capacitors for periodically discharging said first and second capacitors, said unidirectional potential, said fixed potential point and said first and second resistors related so that each of said first and second capacitors are charged at a substantially uniform rate.

3. A circuit for developing balanced push-pull sawtooth voltages comprising a first resistor and a first capacitor serially connected, a second resistor and a second capacitor serially connected, the terminals of said resistors remote from said capacitors having a unidirectional potential impressed therebetween, a third resistor and a third capacitor, the electrodes of said capacitors remote from said first and second resistors being connected to a fixed potential point intermediate in potential to the potentials of said remote terminals of said resistors through said third resistor and said third capacitor connected in shunt, said third resistor having a resistance substantially greater than either of said first and second resistors, said third capacitor having a capacitance substantially greater than either of said other capacitors, said first and second capacitors having substantially equal magnitudes, means in shunt to said first and second capacitors for periodically discharging said first and second capacitors, the time constant of said first resistor and capacitor combination and said second resistor and capacitor combination being substantially greater than the duration of a single cycle of said push-pull voltages, means for coupling to a utilization circuit the push-pull voltages developed across said first and second capacitors.

4. A circuit for developing balanced push-pull sawtooth voltages comprising a first and a second capacitor of substantially equal magnitude serially connected, a first resistance having one end connected to the remote end of one of said capacitors and the other end connected to the positive terminal of a source of potential, a second resistance having one end connected to the remote end of said other capacitor and the other end connected to the negative terminal of said source of potential, a third resistance, the common connection of said first and second capacitors connected through said third resistance to a ground point intermediate in potential to said positive and negative terminals, said third resistance being substantially greater than either of said first and second resistances, said first and second resistances related to said positive and negative supply potentials whereby said capacitors are charged in opposite directions at a uniform rate, a capacitor having a magnitude substantially greater than either said first and second capacitors connected in shunt with said third resistance to form substantially a short circuit between said common connection and said ground point for said push-pull voltages, means connected in shunt between remote points of said first and second capacitors for periodically discharging said capacitors when the potential difference between said remote points reaches a predetermined value, whereby balanced push-pull sawtooth voltages are developed between said ground point and said remote ends of said first and second capacitors.

5. A circuit for developing balanced push-pull voltages comprising first and second capacitors serially connected, a first means connected in circuit with said first capacitor and a second means connected in circuit with said second capacitor for periodically charging said capacitors at a substantially uniform rate and with opposite polarities with respect to the potential at the common terminals of said capacitors, a resistance connected between said common terminals and a fixed potential point intermediate in potential to the potentials to which the remote ends of said capacitors are charged and common to said means, and a capacitor having a capacitance substantially greater than either of said other capacitors connected in shunt with said resistance, whereby any departure from uniformity in the charging rate of said capacitors is eliminated.

References Cited in the file of this patent

UNITED STATES PATENTS

| | | |
|---|---|---|
| 2,178,464 | Baldwin, Jr. | Oct. 31, 1939 |
| 2,180,365 | Norton | Nov. 21, 1939 |
| 2,439,324 | Walker | Apr. 6, 1948 |
| 2,458,366 | Fyler | Jan. 4, 1949 |
| 2,485,101 | Lindahl | Oct. 18, 1949 |
| 2,568,914 | Faudell | Sept. 25, 1951 |
| 2,653,274 | Babcock | Sept. 22, 1953 |